US011187316B2

(12) United States Patent
Wilcox

(10) Patent No.: US 11,187,316 B2
(45) Date of Patent: Nov. 30, 2021

(54) LUBRICATION SYSTEM

(71) Applicant: Bell Helicopter Textron Inc., Fort Worth, TX (US)

(72) Inventor: Matthew Michael Wilcox, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 364 days.

(21) Appl. No.: 16/107,954

(22) Filed: Aug. 21, 2018

(65) Prior Publication Data

US 2020/0063854 A1 Feb. 27, 2020

(51) Int. Cl.
*F16H 57/04* (2010.01)
*F16K 15/02* (2006.01)
*B64C 27/06* (2006.01)

(52) U.S. Cl.
CPC ..... *F16H 57/0442* (2013.01); *F16H 57/0436* (2013.01); *F16H 57/0447* (2013.01); *F16H 57/0471* (2013.01); *F16K 15/028* (2013.01); *B64C 27/06* (2013.01)

(58) Field of Classification Search
CPC ............. F16H 57/0442; F16H 57/0447; F16H 57/0436
See application file for complete search history.

(56) References Cited

U.S. PATENT DOCUMENTS

| 4,129,038 | A | * | 12/1978 | Leutenegger | .......... B67D 7/367 73/307 |
| 4,590,962 | A | * | 5/1986 | Tespa | ...................... F16K 17/30 137/460 |
| 4,637,425 | A | * | 1/1987 | Petersen | ................... E03F 7/04 137/390 |
| 4,976,335 | A | * | 12/1990 | Cappellato | ................ F16N 7/40 184/6.4 |
| 6,817,448 | B2 | * | 11/2004 | Maret | ..................... B64C 27/14 184/6.26 |
| 9,458,923 | B2 | | 10/2016 | Poster et al. | |
| 2002/0195296 | A1 | * | 12/2002 | Maret | ..................... F16N 17/00 184/6.22 |
| 2005/0056490 | A1 | * | 3/2005 | Maret | ..................... F16N 17/00 184/6.2 |
| 2018/0106360 | A1 | * | 4/2018 | Gmirya | ............... F16H 57/0442 |

FOREIGN PATENT DOCUMENTS

| FR | 2826094 A1 | 6/2015 |
| WO | 2016-171786 A1 | 10/2016 |

OTHER PUBLICATIONS

European Search Report; 18214745.4; dated Jul. 12, 2019.
European Exam Report; 18214745.4; dated Sep. 3, 2019.

* cited by examiner

*Primary Examiner* — Michael R Mansen
*Assistant Examiner* — Mark K Buse
(74) *Attorney, Agent, or Firm* — Pramudji Law Group PLLC; Ari Pramudji

(57) ABSTRACT

Various implementations described herein are directed to a lubrication system for a gearbox of an aircraft. A lubrication line is coupled to a plurality of jets and/or orifices to provide lubrication to one or more components of the gearbox. A check valve is placed within the lubrication line in a location upstream from the plurality of jets and/or orifices.

18 Claims, 4 Drawing Sheets

LUBRICATION SYSTEM

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Federal Aviation Administration (FAA) regulations state that certified rotorcraft must be able to operate safely for a prescribed amount of time after a loss of lube scenario. A loss of lube scenario occurs when oil fluid or pressure is lost from a gearbox due to a leak or pump failure. The FAA regulations further state that the rotorcraft must be capable of transmitting a specified power through the drive system to the main rotor and anti-torque systems for a minimum period of time after the initiation of a loss of lube event without catastrophic failure. The FAA regulations are intended to ensure that operators are capable of landing the aircraft in a safe manner after a loss of lube event has occurred.

Previous designs involved a significant amount of engineering analysis during an initial gear and bearing design stage to ensure that adequate geometries, backlashes, and other configurations were utilized to maximize the performance of the system in a loss of lube scenario. Some previous systems utilized auxiliary or emergency lubrication systems that held oil in a reservoir. The oil held in this reservoir is passively or actively released into the transmission during a loss of lube event. Auxiliary or emergency lubrication systems using the above-mentioned reservoir can be expensive and may add a significant amount of weight to the aircraft due to the extra auxiliary tanks, tubing and lines required.

SUMMARY

Described herein are various implementations of a lubrication system for a gearbox of an aircraft. In one implementation, a lubrication line is coupled to a plurality of jets and/or orifices to provide lubrication to one or more components of the gearbox. A check valve is placed within the lubrication line in a location upstream from the plurality of jets and/or orifices.

The one or more components may include one or more rotating components. In one implementation, the one or more rotating components may be one or more rotating gears. In one implementation, the one or more rotating components may be one or more rotating bearings.

The check valve may be automatically actuated when pressure is lost in the pressurized lubrication system. The check valve may be a swing check valve, a wafer check valve, a lift check valve or an in-line check valve.

The check valve may be a manually actuated valve. The manual valve can be actuated using a lever or button. The manual valve may be solenoid powered. The solenoid powered manual valve may receive an indication to actuate via the lever or button.

The check valve may be actuated during a loss of lubrication event. Upon actuation of the check valve, the lubrication can be held captive in the lubrication line and prevented from flowing upstream of the check valve. The lubrication may be held captive in the lubrication line downstream of the check valve until the lubrication is forced out through at least one of the plurality of jets and/or orifices.

In one implementation, the lubrication can be forced out through the at least one of the plurality of jets/and or orifices due to gravity and/or orientation of the aircraft. In one implementation, the lubrication held captive in the lubrication line can be used to reduce system heat generation.

Described herein is a method for providing lubrication to a gearbox of an aircraft. In one implementation, a lubrication line is coupled to a plurality of jets and/or orifices to provide lubrication to one or more components of the gearbox. A valve is placed within the lubrication line in a location upstream from the plurality of jets and/or orifices. The valve is actuated in response to a loss of pressure in the lubrication line.

Described herein is a lubrication system for a gearbox of an aircraft. In one implementation, a lubrication line is coupled to a plurality of jets and/or orifices to provide lubrication to one or more components of the gearbox. A plurality of check valves is placed within the lubrication line in a plurality of strategic locations upstream from the plurality of jets and/or orifices.

The above referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
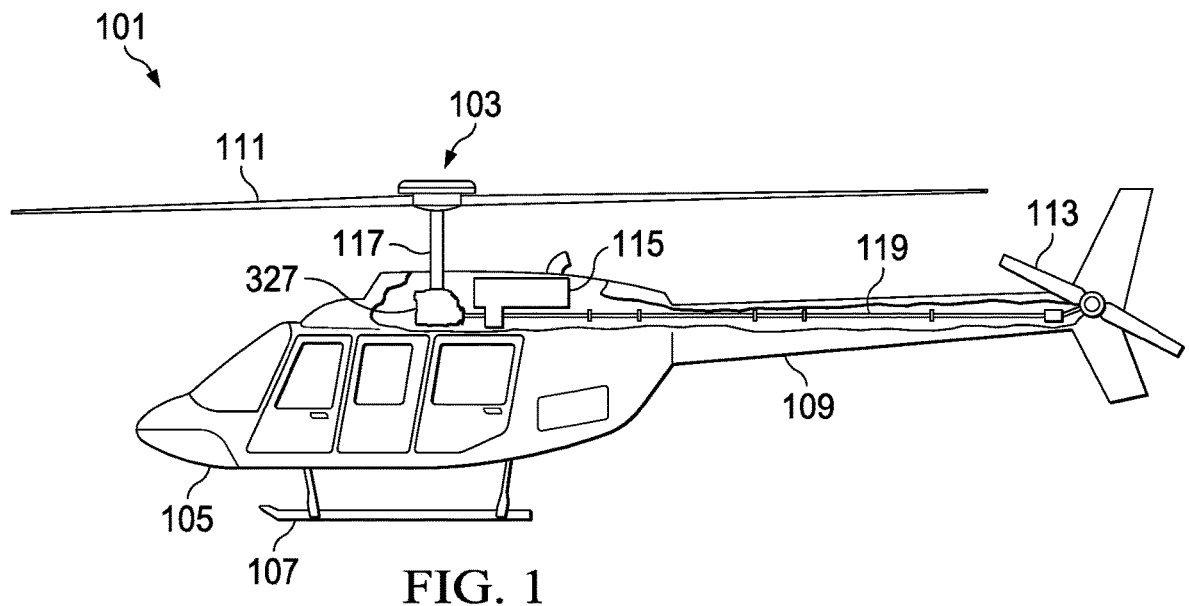
FIG. 1 illustrates a rotorcraft in accordance with implementations of various techniques described herein.

Described herein is a lubrication system that allows lubrication, e.g., oil or any other suitable lubricant, to be redirected into a transmission or gearbox in a scenario where attempted backflow occurs using one or more check valves strategically located in the lubrication system. The lubrication redirected into the transmission or gearbox by the strategically located check valves may be present in lubrications lines, manifolds, and/or fittings of the lubrication system. In one implementation, the lubrication system may be a pressurized lubrication system.

In many pressurized rotorcraft gearboxes, lubrication is delivered to components, e.g., bearings, gears, gear meshes or any other type of moving part that may require lubrication to minimize friction, via targeted jets or orifices fed by a pump.

The targeted jets spray lubrication at a known vector towards the components. Various implementations described herein utilize a check valve or series of check valves directly upstream of these jets or orifices. When a check valve is activated, i.e., closed, during a loss of lubrication event, lubrication is prevented from flowing back down a lubrication line (i.e., upstream of the check valve) towards a leak location or the gearbox sump. The captive lubrication continues to be held in the line(s) downstream of the check valve(s) until residual pressure due to gravity and/or orientation of the aircraft forces the lubrication out through the adjacent jets or orifices. The jets or orifices are located in the vicinity of gears or bearings. These gears or bearings are typically the first ones that are likely to fail in a loss of lubrication event. Any residual lubrication in the system that can be trapped and redirected towards these components can be used to reduce system heat generation and delay the onset of catastrophic failure.

Check valves, e.g., in-line check valves, are typically inexpensive and have a very small packaging envelope, which makes them easy to add to current and future configurations. Adding check valves further provide the advantages of improving current aircraft performance and ensuring that future platforms meet future regulations, which have been made more stringent over time.

A check valve may be placed in-line with the lubrication system, e.g., of a transmission or gearbox, in a location that is directly upstream from a key orifice or series of orifices/jets that feed lubrication to components likely to fail in a loss of lubrication event. Although some pressurized fluid systems already contain check valves in some instances to prevent the backflow of fluid, there are no known instances of a check valve being strategically placed directly upstream of an orifice/jet feeding a high-speed component (e.g., gear, gear mesh, planetary gear, bearing and/or any other rotating component) in order to facilitate the redirection of lubrication in a loss of lubrication event. The check valve(s) placed in the lubrication system may be a swing, wafer, lift, or any other variant of check valve capable of being used in the lubrication system.

Figure 2:
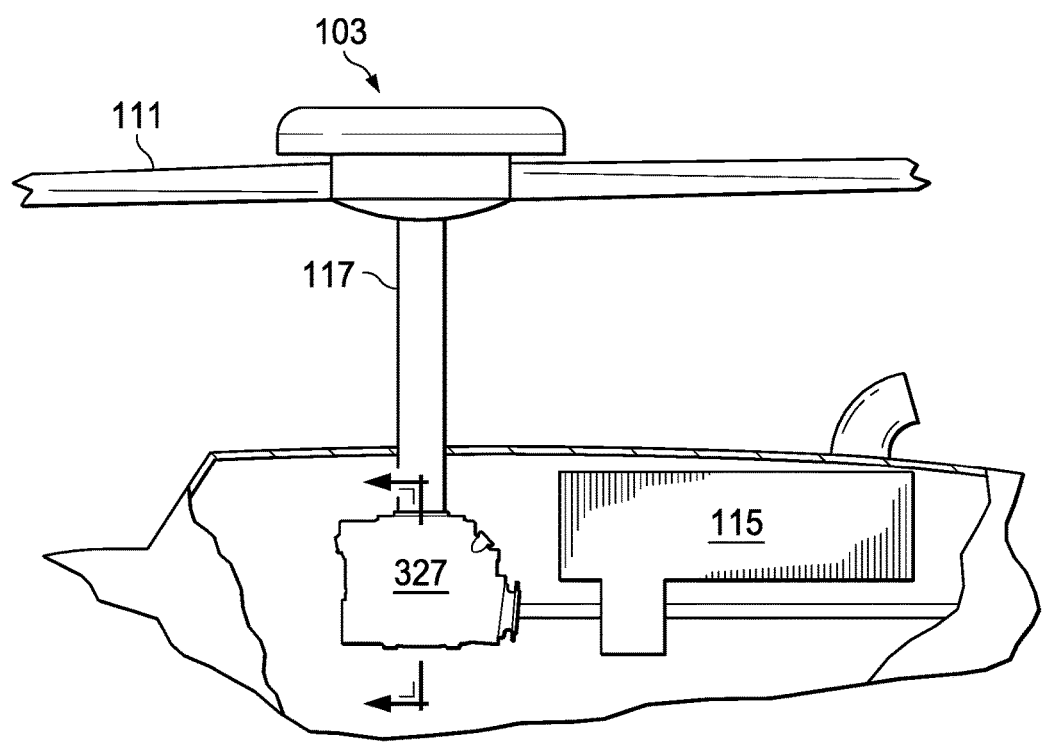
FIG. 2 illustrates a rotorcraft in accordance with implementations of various techniques described herein.

FIG. 1 and FIG. 2 illustrate a rotorcraft 101 according to one implementation. Rotorcraft 101 has a rotor system 103 with a plurality of main rotor blades 111. Rotorcraft 101 further includes a fuselage 105, landing gear 107, a tail member 109, and tail rotor blades 113. An engine 115 supplies torque to a main rotor mast 117 via a gearbox 327 for the rotating of main rotor blades 111. Engine 115 also supplies torque to a tail rotor drive shaft 119 for the rotating of tail rotor blades 113. The pitch of each main rotor blade 111 can be selectively controlled in order to selectively control direction, thrust, and lift of rotorcraft 101. Further, the pitch of tail rotor blades 113 can be selectively controlled in order to selectively control yaw of rotorcraft 101. Rotorcraft 101 is illustrated for exemplary purposes. It should be appreciated that implementations of the present disclosure may be used on aircraft other than rotorcraft, e.g., airplanes, tilt rotors, or unmanned aircraft. Further, implementations of the present disclosure may be used on non-aircraft vehicles.

Figure 3:
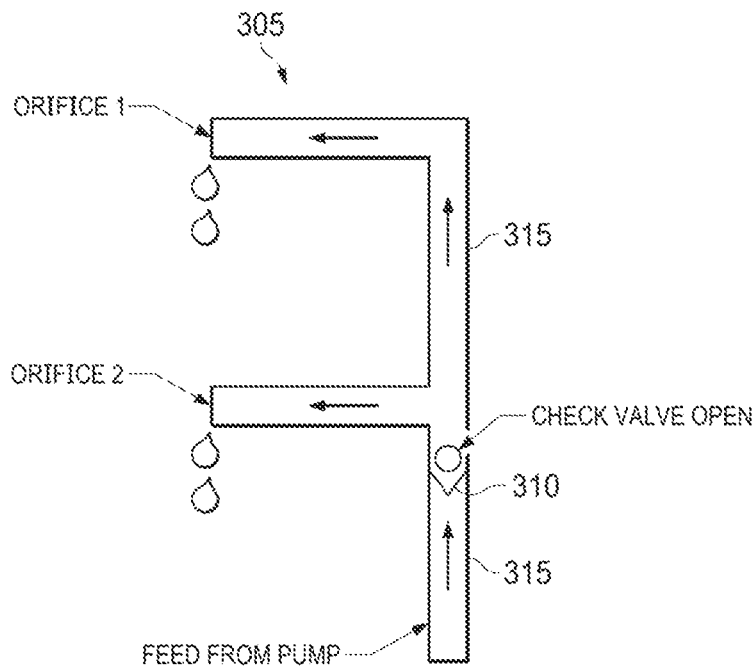
FIG. 3 illustrates a normal operation of an example lubrication system in accordance with implementations of various techniques described herein.

FIG. 3 illustrates a normal operation of an example lubrication system 305 that may be used in conjunction with a transmission or gearbox. Lubrication system 305 may include a lubrication line 315 having one or more check valves 310. Lubrication line 315 may be part of a manifold having a plurality of orifices and coupled to a plurality of orifices (Orifice 1, Orifice 2). The jets/orifices feed components likely to fail in a loss of lubrication event, e.g., high-speed components and/or rotating components.

Lubrication is fed from a pump (not shown) past an open check valve 310. The lubrication system 305 feeds multiple orifices or jets (Orifice 1, Orifice 2) that provide lubrication to a pressurized gearbox (not shown) having gears and/or bearings (not shown). In one implementation, the gears and/or bearings are high-speed components, e.g., high-speed gears, high-speed bearings and/or any other rotating components.

Figure 4:
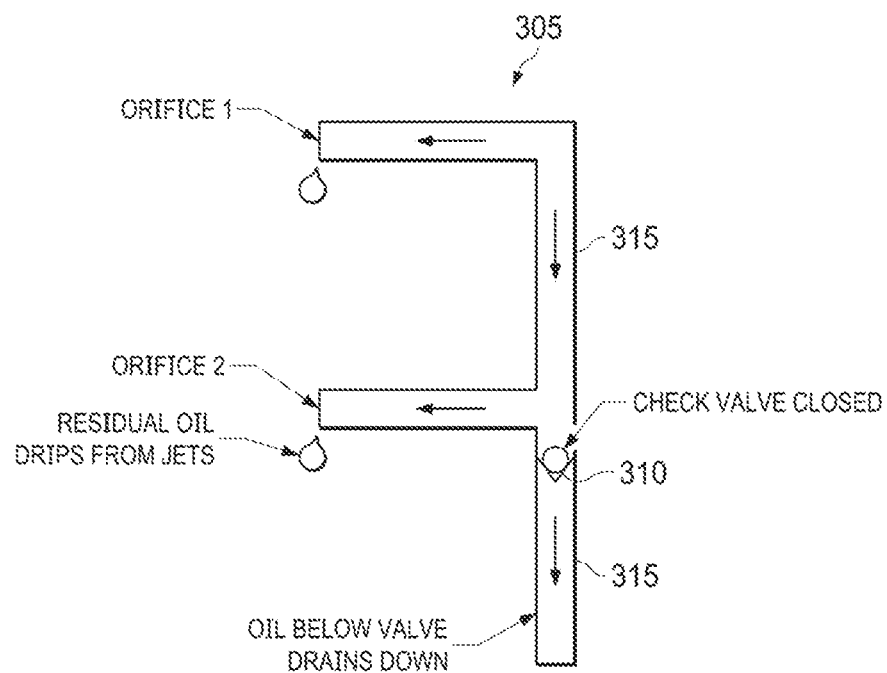
FIG. 4 illustrates an operation of an example lubrication system after a pump failure in accordance with implementations of various techniques described herein.

FIG. 4 illustrates operation of the example lubrication system 305 after a pump failure. In the event of a pump failure, the check valve 310 closes. Since the check valve 310 is placed directly upstream (vertically below) of the orifices or jets (Orifice 1, Orifice 2), the check valve 310 can be used to hold captive any lubrication in the lines 315 of the system downstream (vertically above) from the check valve 310 even if pump pressure is completely lost in the system. Due to residual head pressure in the lubrication induced by gravity, the fluid naturally flows vertically down towards the check valve 310, which in turn, prevents backflow and redirects the lubrication towards the jets/orifices (Orifice 1, Orifice 2) feeding the gears and/or bearings. Since the pressure in the system is dramatically less than nominal operating pressure (due to the pump failure causing the loss of lubrication event), the flow rate of lubrication through the jets/orifices is reduced. The reduction of the flow rate of the lubrication increases the overall amount of time that lubrication is fed to the gears and/or bearings. The reduction in flow rate of the lubrication also decreases the rate of heat generation in the gears and/or bearings due to friction and subsequently delays the onset of failure.

Figure 5:
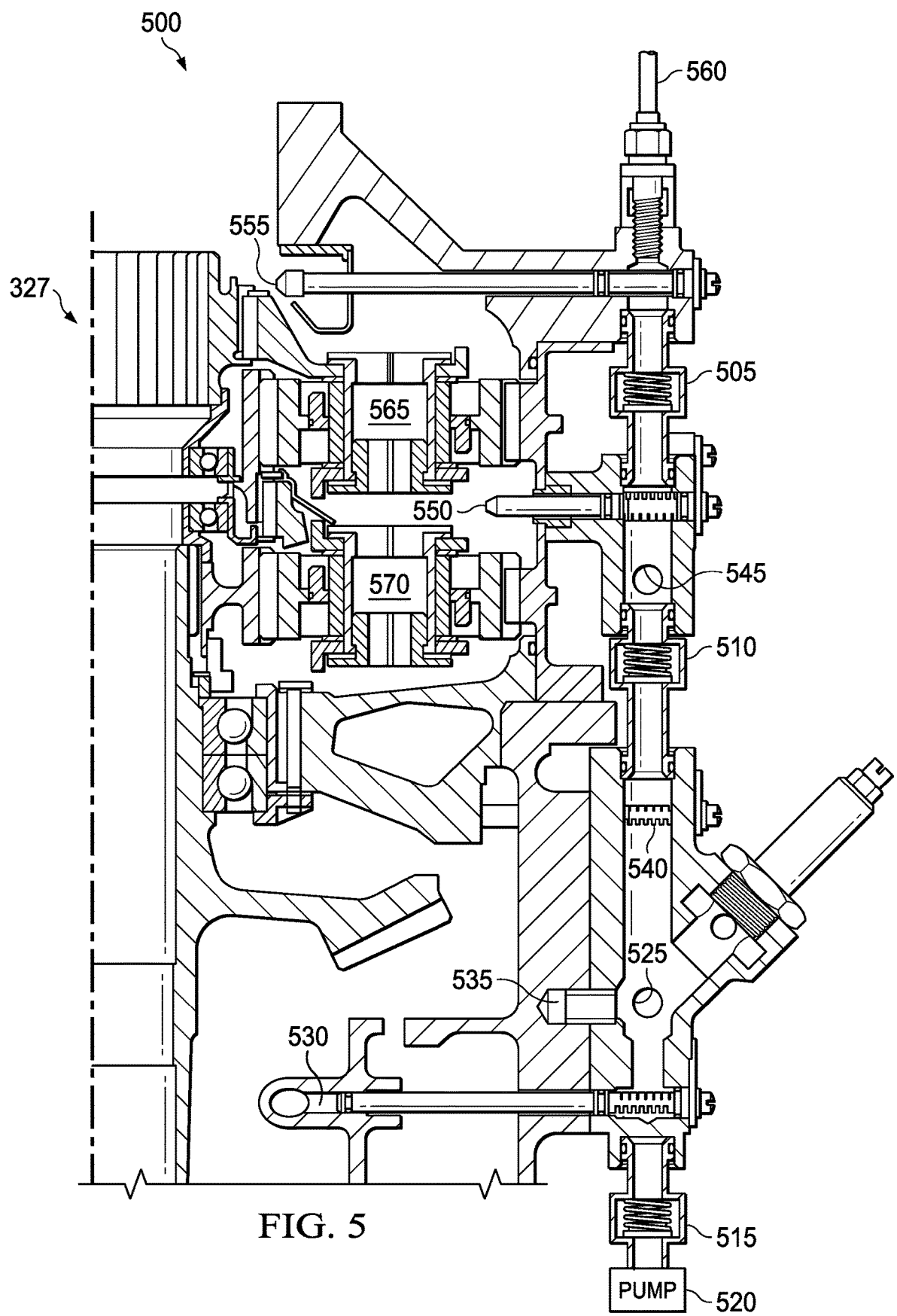
FIG. 5 illustrates a cross-section of a system that includes a lubrication system and a gearbox in accordance with implementations of various techniques described herein.

FIG. 5 illustrates a cross-section of a system 500 that includes a lubrication system 520, 525, 530, 535, 540, 545, 550, 555, 560 and a gearbox 327. System 500 includes check valves 305, 310, 315 in-line with the pressurized lubrication system, which includes pump 320 and jets or orifices 325, 330, 335, 340, 345, 350, 360. In the illustrated embodiment, gearbox 327 is depicted as a gearbox on rotorcraft 101, however, it should be appreciated the system 500 may be equally implemented on a variety of vehicles and structures having gearboxes that require lubrication. Gearbox 327 functions to convert high speed rotation of an output drive shaft of engine 115 into low speed rotation of main rotor mast 117. Gearbox 327 includes a plurality of gears and bearings 565, 570 that require lubrication to properly function.

Lubrication of gearbox 327 is essential to the operation of rotorcraft 101. Rotorcraft regulatory agencies, such as the FAA, may require that gearbox 327 be operable for a requisite period of time after the primary pressurized lubrication system has failed. Such a requirement in a rotorcraft gearbox may be referred to as a "loss of lubrication" situation or a "run dry" capability requirement.

During a loss of lubrication situation, e.g., in the event of a pump failure, the check valves 505, 510, 515 close. Check valve 515 is located directly upstream of jets/orifices 525, 530, 535, 540. Check valve 510 is located directly upstream of jets/orifices 545, 550. Check valve 505 is located directly upstream jets/orifices 555, 560. Check valves 505, 510, 515 can be used to hold captive any lubrication in the lines of the system downstream (vertically above) from each of the check valves 505, 510, 515 even if pump pressure is completely lost in the system. Due to residual head pressure in the lubrication induced by gravity, the fluid naturally flows vertically down towards each check valve 505, 510, 515, which in turn, prevents backflow and redirects the lubrication towards the jets/orifices 525, 530, 535, 540, 545, 550, 560 feeding the gears and/or bearings 565, 570. Since the pressure in the system is dramatically less than nominal operating pressure (due to the pump failure causing the loss of lubrication event), the flow rate of lubrication through the orifices is reduced. The reduction of the flow rate of the lubrication increases the overall amount of time that lubrication is fed to the gears and/or bearings 565, 570. The reduction in flow rate of the lubrication also decreases the rate of heat generation in the gears and/or bearings due to friction and subsequently delays the onset of failure.

In one implementation, one or more of the check valves 505, 510, 515 can be an automatic check valve. The check valve may be actuated automatically in response to a loss in pressure. In one implementation, the loss in pressure automatically activates a spring loaded mechanism of the check valve. As an example, the automatic check valve may be an in-line check valve, a swing check valve, a wafer check valve, a lift check valve, or any other suitable type of check valve.

Figure 6:
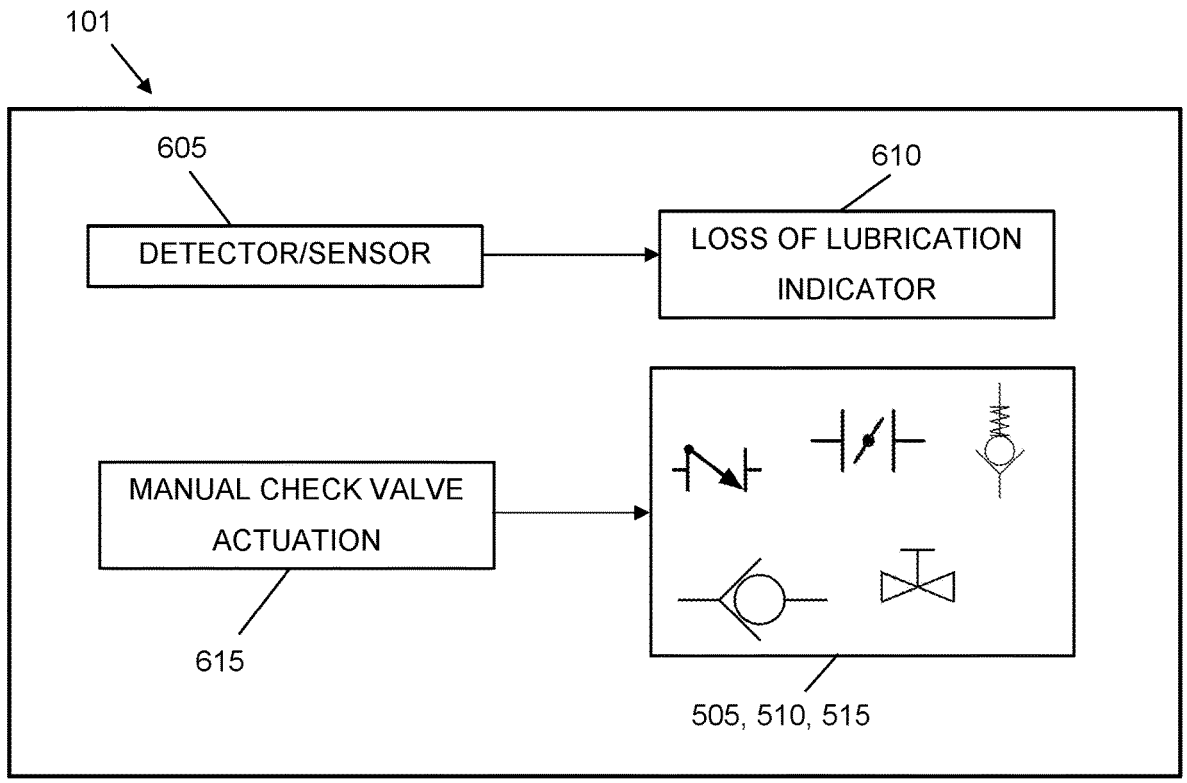
FIG. 6 illustrates a manual check valve system in accordance with implementations of various techniques described herein.

In another implementation, one or more of the valves 505, 510, 515 can be a manual check valve, e.g., a valve manually actuated by the pilot. FIG. 6 illustrates a manual valve system of rotorcraft 101 in accordance with one implementation. A detector 605 is used to detect a loss of pressure in a lubrication system. An indication may be provided to a pilot using loss of lubrication indicator/sensor 610. The indication may be provided using a visual indication and/or an audible indication. In one implementation, the manual valve is actuated by the pilot using a lever or button 615 after the pilot is alerted to the loss of lubrication scenario, e.g., via the indication provided by indicator 610. As an example, the valve 505, 510, 515 is solenoid powered and receives an indication to actuate the solenoid powered valve via the button or lever 615.

Figure 7:
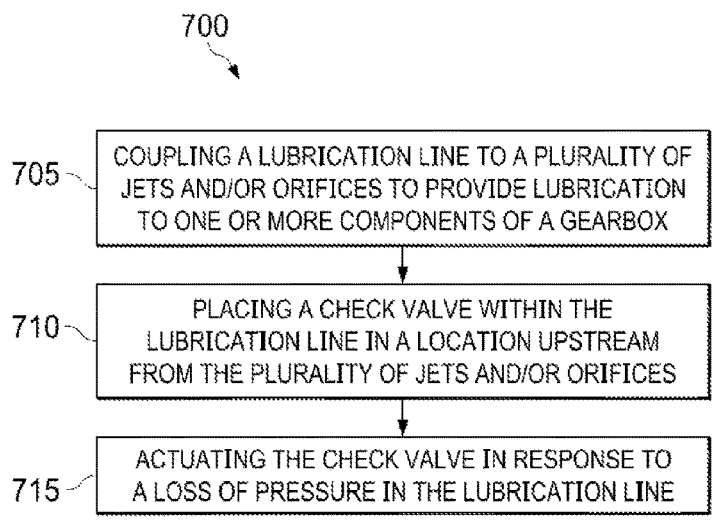
FIG. 7 illustrates a diagram of a method for providing lubrication to a gearbox of an aircraft during a loss of lubrication event in accordance with implementations of various techniques described herein.

FIG. 7 illustrates a diagram of a method 700 for providing lubrication to a gearbox of an aircraft during a loss of lubrication event. At block 705, a lubrication line is coupled to a plurality of jets and/or orifices to provide lubrication to one or more components of a gearbox. At block 710, a check valve is placed within the lubrication line in a location upstream from the plurality of jets and/or orifices.

At block 715, the check valve is actuated in response to a loss of pressure in the lubrication line. During a loss of lubrication event, e.g., when a pump fails, the check valve closes. Since the check valve is placed directly upstream (vertically below) of the jets and/or orifices, the check valve can be used to hold captive any lubrication in the lubrication line of the system downstream (vertically above) from the check valve even if pump pressure is completely lost in the system. The check valve prevents backflow and redirects the lubrication towards the jets and/or orifices feeding the gears and/or bearings of the gearbox. In one implementation, the check valve can be actuated automatically. In another implementation, the check valve can be actuated manually.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A lubrication system for a gearbox of an aircraft, comprising:
   at least one pump;
   a lubrication line downstream of the at least one pump and coupled to a plurality of jets and/or orifices to provide lubrication to one or more components of the gearbox; and
   a check valve placed within the lubrication line in a location upstream from the plurality of jets and/or orifices;
   wherein the check valve is configured to isolate the gearbox from the at least one pump, and
   wherein the check valve is a manually actuated valve.

2. The lubrication system of claim 1, wherein the one or more components comprise one or more rotating components.

3. The lubrication system of claim 2, wherein the one or more rotating components comprises one or more rotating gears.

4. The lubrication system of claim 2, wherein the one or more rotating components comprises one or more rotating bearings.

5. The lubrication system of claim 1, wherein the check valve is configured to actuate when pressure is lost in the lubrication system.

6. The lubrication system of claim 5, wherein the check valve comprises a swing check valve.

7. The lubrication system of claim 5, wherein the check valve comprises a wafer check valve.

8. The lubrication system of claim 5, wherein the check valve comprises a lift check valve.

9. The lubrication system of claim 5, wherein the check valve comprises an in-line check valve.

10. The lubrication system of claim 1, wherein the manual valve is actuated using a lever or button.

11. The lubrication system of claim 10, wherein the manual valve is solenoid powered.

12. The lubrication system of claim 11, wherein solenoid powered manual valve is configured to receive an indication to actuate via the lever or button.

13. The lubrication system of claim 1, wherein when the check valve is actuated, the lubricant is retained in the lubrication line and is prevented from flowing upstream of the check valve.

14. The lubrication system of claim 13, wherein the lubricant is retained in the lubrication line downstream of the check valve until the lubricant is forced out through at least one of the plurality of jets and/or orifices.

15. The lubrication system of claim 14, wherein the lubricant is forced out through the at least one of the plurality of jets/and or orifices due to gravity.

16. The lubrication system of claim 14, wherein the lubricant retained in the lubrication line is used to reduce system heat generation.

17. A method for providing lubrication to a gearbox of an aircraft, comprising:
    coupling a lubrication line from at least one pump to a plurality of jets and/or orifices to provide lubrication to one or more components of the gearbox;
    placing a valve within the lubrication line in a location upstream from the plurality of jets and/or orifices; and
    manually actuating the valve after a loss of pressure in the lubrication line; and
    isolating the gearbox from the at least one pump.

18. A lubrication system for a gearbox of an aircraft, comprising:
    at least one pump;
    a lubrication line downstream of the at least one pump and coupled to a plurality of jets and/or orifices to provide lubrication to one or more components of the gearbox; and
    a plurality of check valves placed within the lubrication line in a plurality of locations upstream from the plurality of jets and/or orifices;
    wherein at least one of the plurality of check valves is a manually actuated valve and is configured to isolate the gearbox from the at least one pump.

* * * * *